United States Patent
Lee et al.

(10) Patent No.: US 10,162,723 B2
(45) Date of Patent: Dec. 25, 2018

(54) ELECTRONIC CARD AND DETECTING METHOD THEREOF

(71) Applicant: APACER TECHNOLOGY INC., New Taipei (TW)

(72) Inventors: Jiunn-Chang Lee, New Taipei (TW); Hung-Wen Pan, New Taipei (TW)

(73) Assignee: APACER TECHNOLOGY INC., New Taipei (TW)

( * ) Notice: Subject to any disclaimer, the term of this patent is extended or adjusted under 35 U.S.C. 154(b) by 148 days.

(21) Appl. No.: 15/398,088

(22) Filed: Jan. 4, 2017

(65) Prior Publication Data
US 2018/0113776 A1  Apr. 26, 2018

(30) Foreign Application Priority Data
Oct. 21, 2016  (TW) .............................. 105133954 A

(51) Int. Cl.
| | |
|---|---|
| *G06F 1/32* | (2006.01) |
| *G06F 11/30* | (2006.01) |
| *G06F 13/32* | (2006.01) |
| *G06F 13/42* | (2006.01) |
| *G06F 13/40* | (2006.01) |

(52) U.S. Cl.
CPC ........ *G06F 11/3031* (2013.01); *G06F 1/3215* (2013.01); *G06F 11/3051* (2013.01); *G06F 13/4068* (2013.01); *G06F 13/4282* (2013.01)

(58) Field of Classification Search
CPC ............. G06F 11/3031; G06F 13/4282; G06F 13/4068; G06F 1/3215; G06F 11/3051
See application file for complete search history.

(56) References Cited

U.S. PATENT DOCUMENTS

| | | | | |
|---|---|---|---|---|
| 2010/0223416 | A1* | 9/2010 | Ibarra | ................. H01R 13/641 710/315 |
| 2011/0016252 | A1* | 1/2011 | Sultenfuss | .......... G06F 13/4081 710/313 |
| 2014/0289434 | A1 | 9/2014 | Ranganathan et al. | |
| 2015/0277935 | A1 | 10/2015 | Desimone et al. | |

FOREIGN PATENT DOCUMENTS

| | | |
|---|---|---|
| CN | 102687131 | 9/2012 |
| CN | 103327656 | 9/2013 |
| TW | 201530318 | 8/2015 |
| TW | 201621657 | 6/2016 |

OTHER PUBLICATIONS

PCI Express M.2 Specification, Revision 1.0, Nov. 1, 2013—pp. 17-18 (Year: 2013).*

* cited by examiner

*Primary Examiner* — Idriss N Alrobaye
*Assistant Examiner* — Ronald T Modo
(74) *Attorney, Agent, or Firm* — Kirton McConkie; Evan R. Witt

(57) ABSTRACT

An electronic card and a detecting method are provided. The electronic card includes a connector. The detecting method detects whether an output signal from a host is received by Pin 41, Pin 43, Pin 47 and Pin 49 of the connector, or Pin 29, Pin 31, Pin 35 and Pin 37 of the connector, or Pin 17, Pin 19, Pin 23 and Pin 25 of the connector, or Pin 5, Pin 7, 11 and Pin 13 of the connector. According to the detecting result and the output signal, the electronic card judges the communication protocol of the host is a SATA communication protocol, a PCIe communication protocol or a USB3.0 communication protocol.

16 Claims, 6 Drawing Sheets

| | | | | |
|---|---|---|---|---|
| | | | GND | 75 |
| 74 | 3.3V | | GND | 73 |
| 72 | 3.3V | | GND | 71 |
| 70 | 3.3V | | PEDET(GND-SATA) | 69 |
| 68 | SUSCLK(32kHz)(I)(0/3.3V) | | N/C | 67 |
| 66 | Module Key | | Module Key | 65 |
| 64 | Module Key | | Module Key | 63 |
| 62 | Module Key | | Module Key | 61 |
| 60 | Module Key | | Module Key | 59 |
| 58 | Reserved for MFG_CLOCK | | GND | 57 |
| 56 | Reserved for MFG_DATA | | N/C | 55 |
| 54 | N/C | | N/C | 53 |
| 52 | N/C | | GND | 51 |
| 50 | N/C | | SATA-A+ | 49 |
| 48 | N/C | | SATA-A- | 47 |
| 46 | N/C | | GND | 45 |
| 44 | N/C | | SATA-B- | 43 |
| 42 | N/C | | SATA-B+ | 41 |
| 40 | N/C | | GND | 39 |
| 38 | DEVSLP(I) | | N/C | 37 |
| 36 | N/C | | N/C | 35 |
| 34 | N/C | | GND | 33 |
| 32 | N/C | | N/C | 31 |
| 30 | N/C | | N/C | 29 |
| 28 | N/C | | GND | 27 |
| 26 | N/C | | N/C | 25 |
| 24 | N/C | | N/C | 23 |
| 22 | N/C | | GND | 21 |
| 20 | N/C | | N/C | 19 |
| 18 | 3.3V | | N/C | 17 |
| 16 | 3.3V | | GND | 15 |
| 14 | 3.3V | | N/C | 13 |
| 12 | 3.3V | | N/C | 11 |
| 10 | DAS/DSS#(I/O) | | GND | 9 |
| 8 | N/C | | N/C | 7 |
| 6 | N/C | | N/C | 5 |
| 4 | 3.3V | | GND | 3 |
| 2 | 3.3V | | GND | 1 |

FIG. 2

| | | | | |
|---|---|---|---|---|
| | | | GND | 75 |
| 74 | 3.3V | | GND | 73 |
| 72 | 3.3V | | GND | 71 |
| 70 | 3.3V | | PEDET(NC-PCIe) | 69 |
| 68 | SUSCLK(32kHz)(I)(0/3.3V) | | N/C | 67 |
| 66 | Module Key | | Module Key | 65 |
| 64 | Module Key | | Module Key | 63 |
| 62 | Module Key | | Module Key | 61 |
| 60 | Module Key | | Module Key | 59 |
| 58 | Reserved for MFG_CLOCK | | GND | 57 |
| 56 | Reserved for MFG_DATA | | REFCLKp | 55 |
| 54 | PEWAKE#(I/O)(0/3.3V) | | REFCLKn | 53 |
| 52 | CLKREQ#(I/O)(0/3.3V) | | GND | 51 |
| 50 | PERST#(I)(0/3.3V) | | PERp0 | 49 |
| 48 | N/C | | PERn0 | 47 |
| 46 | N/C | | GND | 45 |
| 44 | N/C | | PETp0 | 43 |
| 42 | N/C | | PETn0 | 41 |
| 40 | N/C | | GND | 39 |
| 38 | N/C | | PERp1 | 37 |
| 36 | N/C | | PERn1 | 35 |
| 34 | N/C | | GND | 33 |
| 32 | N/C | | PETp1 | 31 |
| 30 | N/C | | PETn1 | 29 |
| 28 | N/C | | GND | 27 |
| 26 | N/C | | PERp2 | 25 |
| 24 | N/C | | PERn2 | 23 |
| 22 | N/C | | GND | 21 |
| 20 | N/C | | PETp2 | 19 |
| 18 | 3.3V | | PETn2 | 17 |
| 16 | 3.3V | | GND | 15 |
| 14 | 3.3V | | PERp3 | 13 |
| 12 | 3.3V | | PERn3 | 11 |
| 10 | LED1#(O) | | GND | 9 |
| 8 | N/C | | PETp3 | 7 |
| 6 | N/C | | PETn3 | 5 |
| 4 | 3.3V | | GND | 3 |
| 2 | 3.3V | | GND | 1 |

FIG. 3

| Pin | Signal | Signal | Pin |
|---|---|---|---|
| 74 | 3.3V | CONFIG_2 (States 4, 5, 6, 7) | 75 |
| 72 | 3.3V | GND | 73 |
| 70 | 3.3V | GND | 71 |
| 68 | SUSCLK(32kHz)(I)(O/3.3V) | CONFIG_1 (States 4, 5, 6, 7) | 69 |
| 66 | SIM_DETECT (I) | RESET# (I)(0/1.8V) | 67 |
| 64 | COEX1 (I/O)(0/1.8V) | ANTCTL3 (O)(0/1.8V) | 65 |
| 62 | COEX2 (I/O)(0/1.8V) | ANTCTL2 (O)(0/1.8V) | 63 |
| 60 | COEX3 (I/O)(0/1.8V) | ANTCTL1 (O)(0/1.8V) | 61 |
| 58 | N/C | ANTCTL0 (O)(0/1.8V) | 59 |
| 56 | N/C | GND | 57 |
| 54 | N/C | N/C | 55 |
| 52 | N/C | N/C | 53 |
| 50 | N/C | GND | 51 |
| 48 | GPIO_4 - TX_BLANKING/GNSS_1/UIM_PWR2/IPC_4 (I/O)(0/1.8V) | N/C | 49 |
| 46 | GPIO_3 - SYSCLK/GNSS_0/UIM_RST2/IPC_3 (I/O)(0/1.8V) | N/C | 47 |
| 44 | GPIO_2 - GNSS_IRQ/GNSS_IRQ/UIM_CLK2/IPC_2 (I/O)(0/1.8V) | GND | 45 |
| 42 | GPIO_1 - GNSS_SDA/GNSS_SDA/UIM_DAT2/IPC_1 (I/O)(0/1.8V) | N/C | 43 |
| 40 | GPIO_0 - GNSS_SCL/GNSS_SCL/SIM_DET2/IPC_0 (I/O)(0/1.8V) | N/C | 41 |
| 38 | N/C | GND | 39 |
| 36 | UIM-PWR (O) | USB3.0-Rx+ | 37 |
| 34 | UIM-DATA (IO) | USB3.0-Rx- | 35 |
| 32 | UIM-CLK (O) | GND | 33 |
| 30 | UIM-RESET (O) | USB3.0-Tx+ | 31 |
| 28 | GPIO_8 - AUDIO_3/AUDIO_3/RFU/IPC_6-AUDIO_3 (I/O) (0/1.8V) | USB3.0-Tx- | 29 |
| 26 | GPIO_10 - W_DISABLE2#/W_DISABLE2#/W_DISABLE2# (I/O) (0/1.8V)/HSIC_STROBE (I/O)(0/1.2V) | GND | 27 |
| 24 | GPIO_7 - AUDIO_2/AUDIO_2/RFU/IPC_5-AUDIO_2 (I/O) (0/1.8V) | DPR (I)(0/1.8V) | 25 |
| 22 | GPIO_6 - AUDIO_1/AUDIO_1/RFU/AUDIO_1 (I/O)(0/1.8V) | GPIO_11 - WoWWAN#/WoWWAN#/WoWWAN# (O)(0/1.8V)/HSIC_DATA (I/O)(0/1.2V) | 23 |
| 20 | GPIO_5 - AUDIO_0/AUDIO_0/RFU/AUDIO_0 (I/O)(0/1.8V) | CONFIG_0 = GND | 21 |
| 18 | Module Key | Module Key | 19 |
| 16 | Module Key | Module Key | 17 |
| 14 | Module Key | Module Key | 15 |
| 12 | Module Key | Module Key | 13 |
| 10 | GPIO_9 - LED_1#/LED_1#/LED_1# (O)(OD)(0/3.3V) /IPC_7 (I/O)(0/1.8V) | GND | 11 |
| 8 | W_DISABLE1# (I)(0/3.3V) | USB_D- | 9 |
| 6 | FULL_CARD_POWER_OFF# (I)(0/1.8V) | USB_D+ | 7 |
| 4 | 3.3V | GND | 5 |
| 2 | 3.3V | GND | 3 |
|  |  | CONFIG_3 = NC | 1 |

FIG. 4

ELECTRONIC CARD AND DETECTING METHOD THEREOF

FIELD OF THE INVENTION

The present invention relates to an electronic device and a detecting method, and more particularly to an electronic card and a detecting method for detecting a communication protocol of a host and automatically executing a firmware unit corresponding to the communication protocol.

BACKGROUND OF THE INVENTION

Generally, the connectors of electronic cards have to comply with a Mini PCI-Express standard, an mSATA standard or an M.2 standard. The connector complying with the Mini PCI-Express standard supports the PCIe communication protocol. The connector complying with the mSATA standard supports the SATA communication protocol. The connector complying with the M.2 standard, formerly known as the Next Generation Form Factor (NGFF), supports the SATA communication protocol, the PCIe communication protocol and the USB 3.0 communication protocol. As known, the connector complying with the M.2 standard has many benefits such as small size, low power consumption and fast transmission speed and is able to support the above three communication protocol. Consequently, the connector complying with the M.2 standard becomes the mainstream.

As mentioned above, the connector complying with the M.2 standard can support the SATA communication protocol, the PCIe communication protocol and the USB 3.0 communication protocol. However, since each of the electronic card and the host (e.g., a motherboard) is designed to support a single communication protocol, some drawbacks occur. That is, the host is only able to support one of SATA communication protocol, the PCIe communication protocol and the USB 3.0 communication protocol, and the electronic card is only able to support one of the SATA communication protocol, the PCIe communication protocol and the USB 3.0 communication protocol. Moreover, it is difficult for the user to realize the communication protocol of the host. While the electronic card and the host handshake with each other to exchange data packets through an out-of-band (OOB) signal, if the communication protocol of the host and the communication protocol of the electronic card are different, the data packets cannot be accurately exchanged. Under this circumstance, the host and the electronic card cannot be in communication with each other. That is, the user has to change the electronic card until the electronic card complies with the communication protocol of the host. Even if the connector complying with the M.2 standard can support different communication protocols, the electronic card with the M.2 connector is not convenient. Moreover, while the electronic card and the host handshake with each other through the OOB signal, the electronic card with the M.2 connector and the host exchanges data packets only if the electronic card complies with the communication protocol of the electronic card. When the electronic card is coupled with the host, the electronic card cannot automatically detect the communication protocol of the host and select the corresponding communication protocol. In other words, the conventional electronic card with the M.2 connector is not user-friendly.

Therefore, there is a need of providing an improved electronic card and a detecting method in order to solve the above drawbacks.

SUMMARY OF THE INVENTION

An object of the present invention provides an electronic card and a detecting method. As previously described, the conventional electronic card is not user-friendly because it only supports a single communication protocol. The firmware unit of the electronic card of the present invention is selectively executed according to the communication protocol of the host. Consequently, the electronic card of the present invention is more user-friendly.

In accordance with an aspect of the present invention, there is provided a detecting method for an electronic card. The electronic card has a connector complying with an M.2 standard. The electronic card receives an output signal from a host through at least one of plural pins of the connector. The detecting method includes the following steps. Firstly, a step (a) is performed to detect whether the output signal is received by Pin 17, Pin 19, Pin 23 and Pin 25 or Pin 5, Pin 7, Pin 11 and Pin 13. In a step (b), if a detecting result of the step (a) is satisfied, a communication protocol of the host is judged as a PCIe communication protocol and the detecting method is ended. If the detecting result of the step (a) is not satisfied, a step (c) is performed to detect whether the output signal is received by Pin 41, Pin 43, Pin 47 and Pin 49. In a step (d), if a detecting result of the step (c) is satisfied, the communication protocol of the host is judged as the PCIe communication protocol or an SATA communication protocol according to the output signal, and the detecting method is ended. If the detecting result of the step (c) is not satisfied, a step (e) is performed to detect whether the output signal is received by Pin 29, Pin 31, Pin 35 and Pin 37. In a step (f), if a detecting result of the step (e) is satisfied, the communication protocol of the host is judged as the PCIe communication protocol or a USB 3.0 communication protocol according to the output signal and the detecting method is ended. If the detecting result of the step (e) is not satisfied, the detecting method is ended.

In accordance with another aspect of the present invention, there is provided a detecting method for an electronic card. The electronic card has a connector complying with an M.2 standard. The electronic card receives an output signal from a host through at least one of plural pins of the connector. The detecting method includes the following steps. In a step (a), a first detecting operation, a second detecting operation and a third detecting operation are defined. When the first detecting operation, the second detecting operation or the third detecting operation is performed, the electronic card detects whether the output signal is received by the corresponding pins of the connector. When the first detecting operation is performed, the electronic card detects whether the output signal is received by Pin 5, Pin 7, Pin 11 and Pin 13 or Pin 17, Pin 19, Pin 23 and Pin 25 of the connector 11, and the communication protocol of the host is judged as the PCIe communication protocol if a detecting result of the first detecting operation is satisfied. When the second detecting operation is performed, the electronic card detects whether the output signal is received by Pin 41, Pin 43, Pin 47 and Pin 49, and the communication protocol of the host is judged as the PCIe communication protocol or the SATA communication protocol if a detecting result of the second detecting operation is satisfied. When the third detecting operation is performed, the electronic card detects whether the output signal is received by Pin 29, Pin 31, Pin 35 and Pin 37, the communication protocol of the host is judged as the PCIe communication protocol or the USB3.0 communication protocol if a detecting result of the third detecting operation is satisfied. In a step (b), any detecting operation of the first detecting operation, the second detecting operation and the third detecting operation is performed. If the communication protocol of the host is recognized, the detecting method is ended. In a step (c), if the communication protocol of the host is not recognized in the step (b), another detecting operation of the first detecting operation, the second detecting operation and the third detecting operation is performed. If the communication protocol of the host is recognized, the detecting method is ended. In a step (d), if the communication protocol of the host is not recognized in the step (c), a remaindering detecting operation of the first detecting operation, the second detecting operation and the third detecting operation is performed, and then the detecting method is ended.

In accordance with a further aspect of the present invention, there is provided an electronic card. The electronic card is in communication with a host. The electronic card includes a first firmware unit, a second firmware unit, a third firmware unit, a connector and a switching control unit. When the first firmware unit is executed, the electronic card supports a SATA communication protocol. When the second firmware unit is executed, the electronic card supports a PCIe communication protocol. When the third firmware unit is executed, the electronic card supports a USB 3.0 communication protocol. The connector complies with an M.2 standard, and serves as a communication medium between the electronic card and the host. The electronic card receives an output signal from the host through at least one of plural pins of the connector. The switching control unit is electrically connected with the plural pins. The first firmware unit, the second firmware unit or the third firmware unit is selectively executed by the switching control unit according to a communication protocol of the host.

The above contents of the present invention will become more readily apparent to those ordinarily skilled in the art after reviewing the following detailed description and accompanying drawings, in which:

BRIEF DESCRIPTION OF THE DRAWINGS

FIG. 2 schematically illustrates the pin definitions connector of the M.2 connector of the electronic card of FIG. 1 according to the SATA communication protocol;

FIG. 3 schematically illustrates the pin definitions connector of the M.2 connector of the electronic card of FIG. 1 according to the PCIe communication protocol;

FIG. 4 schematically illustrates the pin definitions connector of the M.2 connector of the electronic card of FIG. 1 according to the USB 3.0 communication protocol;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
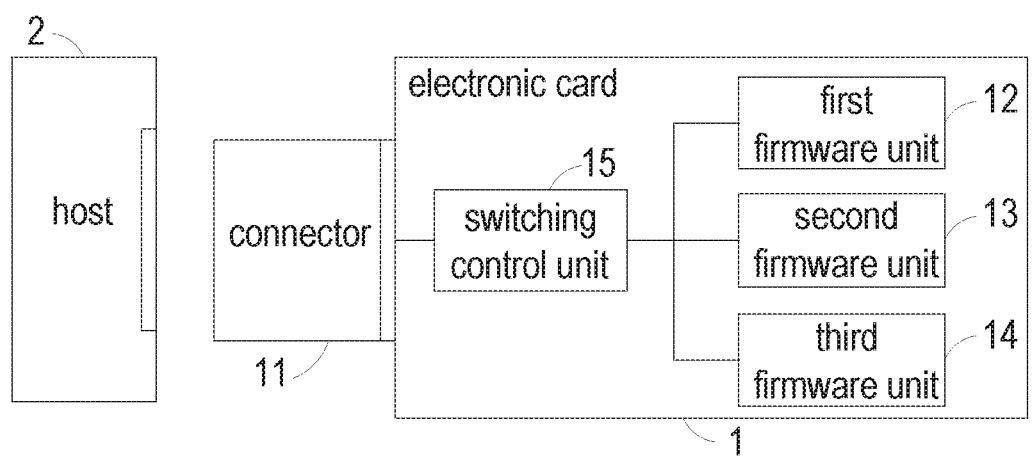
FIG. 1 schematically illustrates the relationship between an electronic card and a host according to an embodiment of the present invention.

FIG. 1 schematically illustrates the relationship between an electronic card and a host according to an embodiment of the present invention. An example of the electronic card 1 includes but is not limited to a solid state drive (SSD) or a non-volatile memory module. The electronic card 1 is detachably coupled with an insertion slot of a motherboard of the host 2. When the electronic card 1 is coupled with host 2, the host 2 issues an output signal to the electronic card 1. According to the output signal, the host 2 and the electronic card 1 are in communication with each other to exchange data. In an embodiment, the electronic card 1 comprises a connector 11, a first firmware unit 12, a second firmware unit 13, a third firmware unit 14 and a switching control unit 15. The connector 11 complies with the M.2 standard. Moreover, the connector 11 can be plugged to the host 2. The connector 11 is a communication medium between the electronic card 1 and the host 2. In addition, the connector 11 comprises plural pins. When the electronic card 1 and the host 2 are coupled with each other, the pins of the electronic card 1 and the corresponding pins of the host 2 are electrically connected with each other. In addition, the electronic card 1 receives the output signal from the hot 2 through at least one pin of the plural pins.

When the first firmware unit 12 is executed, the electronic card 1 supports the SATA communication protocol. Consequently, the electronic card 1 and the host 2 exchange data through the connector 11 according to the SATA communication protocol. When the second firmware unit 13 is executed, the electronic card 1 supports the PCIe communication protocol. Consequently, the electronic card 1 and the host 2 exchange data through the connector 11 according to the PCIe communication protocol. When the third firmware unit 14 is executed, the electronic card 1 supports the USB3.0 communication protocol. Consequently, the electronic card 1 and the host 2 exchange data through the connector 11 according to the USB3.0 communication protocol.

The switching control unit 15 is electrically connected with the plural pins of the connector 11. For example, the switching control unit 15 is a microcontroller. According to the communication protocol of the host 2, the switching control unit 15 executes the first firmware unit 12, the second firmware unit 13 or the third firmware unit 14 to support the SATA communication protocol, the PCIe communication protocol or the USB3.0 communication protocol. Consequently, the host 2 and the electronic card 1 exchange data according to the same communication protocol.

As mentioned above, the first firmware unit 12, the second firmware unit 13 or the third firmware unit 14 of the electronic card 1 is selectively executed to support the SATA communication protocol, the PCIe communication protocol or the USB3.0 communication protocol according to the communication protocol of the host 2. Consequently, the host 2 and the electronic card 1 exchange data according to the same communication protocol. As previously described, the conventional electronic card is not user-friendly because it only supports a single communication protocol. Since the firmware unit of the electronic card 1 of the present invention is selectively executed according to the communication protocol of the host 2, the electronic card 1 is more user-friendly.

Moreover, the connector 11 of the electronic card 1 has one of three key types, e.g. a B key type, an M key type or a B+M. The key type of the connector 11 is selected according to the communication protocol. That is, the pin definitions of the connector 11 are determined according to the key type.

FIG. 2 schematically illustrates the pin definitions connector of the M.2 connector of the electronic card of FIG. 1 according to the SATA communication protocol. When the electronic card 1 and the host 2 are in communication with the host 2 according to the SATA communication protocol, Pin 41, Pin 43, Pin 47 and Pin 49 receive the output signal from the host 2. Consequently, the electronic card 1 is in communication with host 2 through Pin 41, Pin 43, Pin 47 and Pin 49.

FIG. 3 schematically illustrates the pin definitions connector of the M.2 connector of the electronic card of FIG. 1 according to the PCIe communication protocol. When the electronic card 1 and the host 2 are in communication with each other according to the PCIe communication protocol, Pin 41, Pin 43, Pin 47 and Pin 49 receive the output signal from the host 2, or Pin 29, Pin 31, Pin 35 and Pin 37 receive the output signal from the host 2, or Pin 17, Pin 19, Pin 23 and Pin 25 receive the output signal from the host 2, or Pin 5, Pin 7, Pin 11 and Pin 13 receive the output signal from the host 2. Consequently, the electronic card 1 is in communication with the host 2 through Pin 41, Pin 43, Pin 47 and Pin 49, or Pin 29, Pin 31, Pin 35 and Pin 37, or Pin 17, Pin 19, Pin 23 and Pin 25, or Pin 5, Pin 7, Pin 11 and Pin 13.

FIG. 4 schematically illustrates the pin definitions connector of the M.2 connector of the electronic card of FIG. 1 according to the USB 3.0 communication protocol. When the electronic card 1 and the host 2 are in communication with each other according to the USB 3.0 communication protocol, Pin 29, Pin 31, Pin 35 and Pin 37 receive the output signal from the host 2. Consequently, the electronic card 1 is in communication with host 2 through Pin 29, Pin 31, Pin 35 and Pin 37.

Moreover, Pin 41, Pin 43, Pin 47 and Pin 49 are differential signal pairs according to the SATA communication protocol. Moreover, Pin 41, Pin 43, Pin 47 and Pin 49, or Pin 29, Pin 31, Pin 35 and Pin 37, or Pin 17, Pin 19, Pin 23 and Pin 25, or Pin 5, Pin 7, Pin 11 and Pin 13 are differential signal pairs according to the PCIe communication protocol. Moreover, Pin 29, Pin 31, Pin 35 and Pin 37 are differential signal pairs according to the USB 3.0 communication protocol. The differential signal pairs are used to receive the output signal (i.e. a differential signal) from the host 2.

As mentioned above, the switching control unit 15 executes the first firmware unit 12, the second firmware unit 13 or the third firmware unit 14 to support the SATA communication protocol, the PCIe communication protocol or the USB3.0 communication protocol according to the communication protocol of the host 2. For judging the communication protocol of the host 2, the switching control unit 15 further performs a detecting method.

Figure 5:
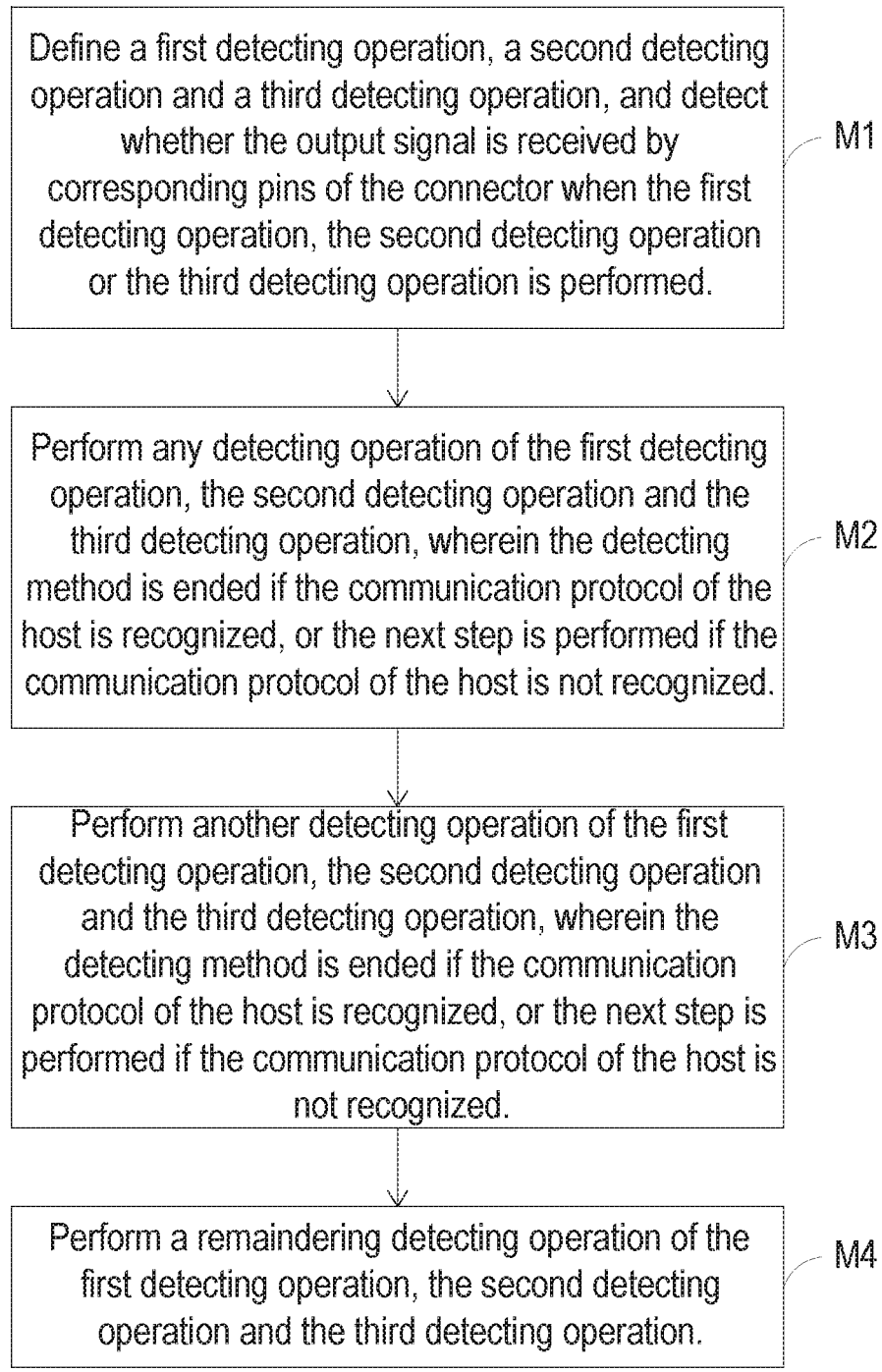
FIG. 5 is a flowchart of a detecting method for an electronic card according to a first embodiment of the present invention.

FIG. 5 is a flowchart of a detecting method for an electronic card according to a first embodiment of the present invention. In a step M1, a first detecting operation, a second detecting operation and a third detecting operation are defined. When the first detecting operation is performed, the switching control unit 15 detects whether the output signal is received by Pin 5, Pin 7, Pin 11 and Pin 13 or Pin 17, Pin 19, Pin 23 and Pin 25 of the connector 11. If the detecting result of the first detecting operation is satisfied, the switching control unit 15 judges that the communication protocol of the host 2 is the PCIe communication protocol.

When the second detecting operation is performed, the switching control unit 15 detects whether the output signal is received by Pin 41, Pin 43, Pin 47 and Pin 49. If the detecting result of the second detecting operation is satisfied, the switching control unit 15 judges that the communication protocol of the host 2 is the PCIe communication protocol or the SATA communication protocol. When the third detecting operation is performed, the switching control unit 15 detects whether the output signal is received by Pin 29, Pin 31, Pin 35 and Pin 37. If the detecting result of the third detecting operation is satisfied, the switching control unit 15 continuously detects the output signal and judges whether the communication protocol of the host 2 is the PCIe communication protocol or the USB3.0 communication protocol.

In a step M2, any detecting operation of the first detecting operation, the second detecting operation and the third detecting operation is performed. If the communication protocol of the host 2 is recognized, the detecting method is ended. If the communication protocol of the host 2 is not recognized, the next step is performed.

In a step M3, another detecting operation of the first detecting operation, the second detecting operation and the third detecting operation is performed. If the communication protocol of the host 2 is recognized, the detecting method is ended. If the communication protocol of the host 2 is not recognized, the next step is performed.

In a step M4, a remaindering detecting operation of the first detecting operation, the second detecting operation and the third detecting operation is performed.

After the above detecting method is completed, the switching control unit 15 can judge which of the SATA communication protocol, the PCIe communication protocol and the USB3.0 communication protocol is the communication protocol of the host 2. If the communication protocol of the host 2 is the SATA communication protocol, the switching control unit 15 executes the first firmware unit 12 to support the SATA communication protocol. If the communication protocol of the host 2 is the PCIe communication protocol, the switching control unit 15 executes the second firmware unit 13 to support the PCIe communication protocol. If the communication protocol of the host 2 is the USB 3.0 communication protocol, the switching control unit 15 executes the third firmware unit 14 to support the USB 3.0 communication protocol.

Moreover, if the detecting result of the second detecting operation indicates that the output signal is received by Pin 41, Pin 43, Pin 47 and Pin 49, the switching control unit 15 further judges whether the communication protocol of the host 2 is the PCIe communication protocol or the SATA communication protocol according to a first predetermined judging rule. In an embodiment, the first predetermined judging rule is based on the voltage difference of the output signal. For example, if the voltage difference of the output signal is in a first range, the switching control unit 15 judges that the communication protocol of the host 2 is the PCIe communication protocol. Whereas, if the voltage difference of the output signal is in a second range, the switching control unit 15 judges that the communication protocol of the host 2 is the SATA communication protocol. After the switching control unit 15 recognizes the communication protocol of the host 2 according to the first predetermined judging rule, the detecting method is ended.

In another embodiment, the switching control unit 15 of the electronic card 1 directly judges whether the communication protocol of the output signal from the host 2 is the PCIe communication protocol or the SATA communication protocol according to the signal definition of the physical layer (i.e., the voltage or the wavelength of the signal). That is, if the detecting result of the second detecting operation indicates that the output signal is received by Pin 41, Pin 43, Pin 47 and Pin 49, the switching control unit 15 can recognize which of the PCIe communication protocol and the SATA communication protocol is the communication protocol of the output signal according to the signal definition of the physical layer. Consequently, the communication protocol of the host 2 is realized. After the switching control unit 15 recognizes the communication protocol of the host 2 according to the signal definition of the physical layer, the detecting method is ended. The signal definitions of the physical layer for the SATA communication protocol, the PCIe communication protocol and the USB3.0 communication protocol are well known to those skilled in the art, and are not redundantly described herein.

Moreover, if the detecting result of the third detecting operation indicates that the output signal is received by Pin 29, Pin 31, Pin 35 and Pin 37, the switching control unit 15 further judges whether the communication protocol of the host 2 is the PCIe communication protocol or the USB 3.0 communication protocol according to a second predetermined judging rule. In an embodiment, the second predetermined judging rule is based on the voltage difference of the output signal. For example, if the voltage difference of the output signal is in the first range, the switching control unit 15 judges that the communication protocol of the host 2 is the PCIe communication protocol. Whereas, if the voltage difference of the output signal is in a third range, the switching control unit 15 judges that the communication protocol of the host 2 is the USB 3.0 communication protocol. After the switching control unit 15 recognizes the communication protocol of the host 2 according to the second predetermined judging rule, the detecting method is ended. The first range, the second range and the third range of the voltage difference of the output signal are determined according to experiments.

In another embodiment, the switching control unit 15 of the electronic card 1 directly judges whether the communication protocol of output signal from the host 2 is the PCIe communication protocol or the USB 3.0 communication protocol according to the signal definition of the physical layer (i.e., the voltage or the wavelength of the signal). That is, if the detecting result of the second detecting operation indicates that the output signal is received by Pin 29, Pin 31, Pin 35 and Pin 37, the switching control unit 15 can recognize which of the PCIe communication protocol and the USB 3.0 communication protocol is the communication protocol of the output signal according to the signal definition of the physical layer. Consequently, the communication protocol of the host 2 is realized. After the switching control unit 15 recognizes the communication protocol of the host 2 according to the signal definition of the physical layer, the detecting method is ended. The signal definitions of the physical layer for the SATA communication protocol, the PCIe communication protocol and the USB3.0 communication protocol are well known to those skilled in the art, and are not redundantly described herein.

In the above embodiment, the sequence of performing the first detecting operation, the second detecting operation and the third detecting operation is not restricted. In some other embodiments, the first detecting operation, the second detecting operation and the third detecting operation are performed according to a predetermined sequence. A detecting method of performing the first detecting operation, the second detecting operation and the third detecting operation according to the predetermined sequence will be described as follows.

Figure 6:
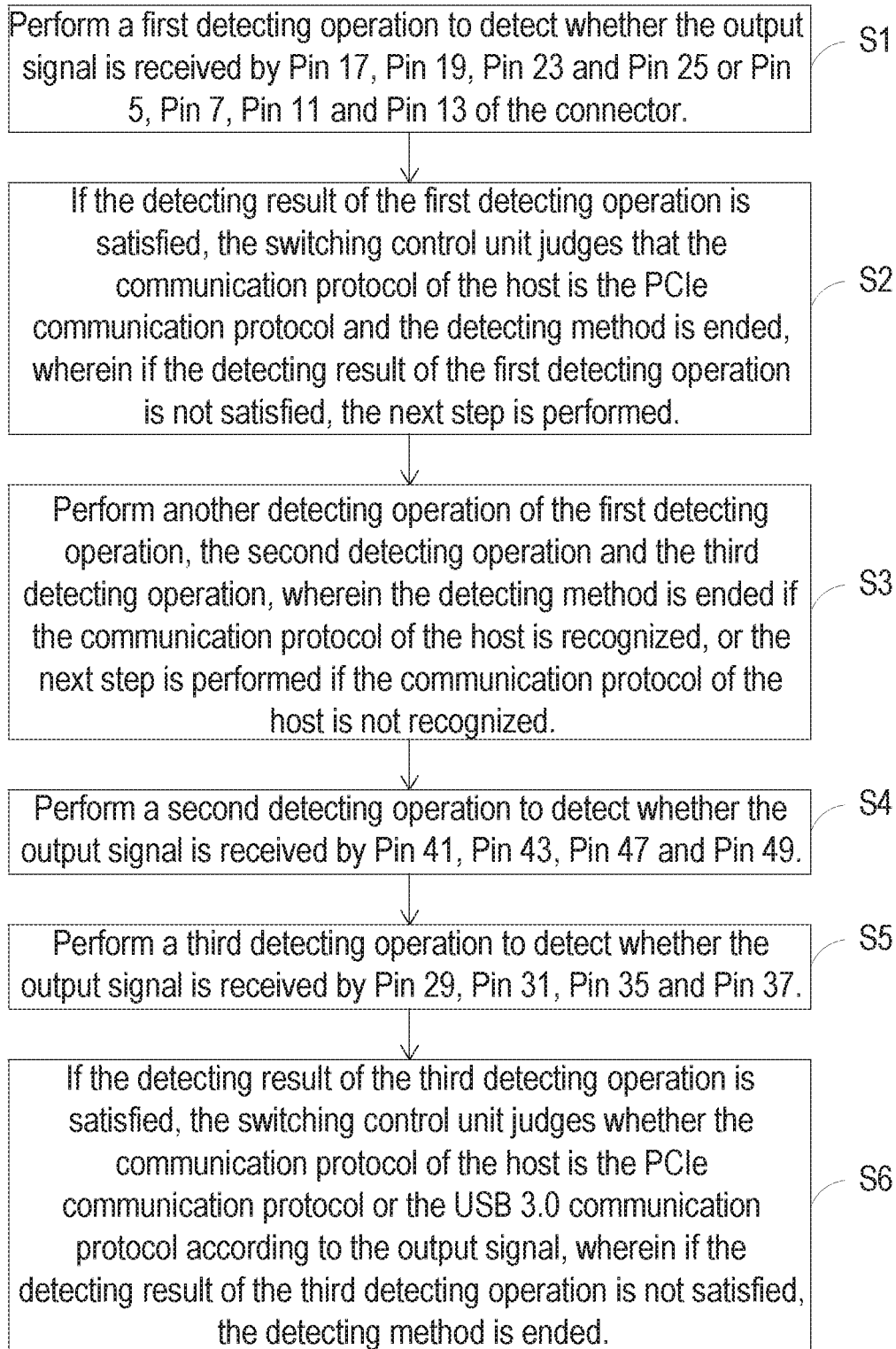
FIG. 6 is a flowchart of a detecting method for an electronic card according to a second embodiment of the present invention.

FIG. 6 is a flowchart of a detecting method for an electronic card according to a second embodiment of the present invention.

Firstly, in a step S1, the switching control unit 15 performs a first detecting operation to detect whether the output signal is received by Pin 17, Pin 19, Pin 23 and Pin 25 or Pin 5, Pin 7, Pin 11 and Pin 13 of the connector 11.

Then, a step S2 is performed. If the detecting result of the first detecting operation is satisfied, the switching control unit 15 judges that the communication protocol of the host 2 is the PCIe communication protocol and the detecting method is ended. If the detecting result of the first detecting operation is not satisfied, the next step is performed.

In a step S3, the switching control unit 15 performs a second detecting operation to detect whether the output signal is received by Pin 41, Pin 43, Pin 47 and Pin 49.

Then, a step S4 is performed. If the detecting result of the second detecting operation is satisfied, the switching control unit 15 judges whether the communication protocol of the host 2 is the PCIe communication protocol or the SATA communication protocol according to the output signal. If the detecting result of the second detecting operation is not satisfied, the next step is performed.

In a step S5, the switching control unit 15 performs a third detecting operation to detect whether the output signal is received by Pin 29, Pin 31, Pin 35 and Pin 37.

Then, a step S6 is performed. If the detecting result of the third detecting operation is satisfied, the switching control unit 15 judges whether the communication protocol of the host 2 is the PCIe communication protocol or the USB 3.0 communication protocol according to the output signal. If the detecting result of the third detecting operation is not satisfied, the detecting method is ended.

From the above descriptions, the present invention provides an electronic card and a detecting method. The electronic card comprises a first firmware unit, a second firmware unit and a third firmware unit. When the first firmware unit is executed, the electronic card supports the SATA communication protocol. When the second firmware unit is executed, the electronic card supports the PCIe communication protocol. When the third firmware unit is executed, the electronic card supports the USB3.0 communication protocol. By performing the detecting method, the electronic card automatically detects whether the communication protocol of the host is the SATA communication protocol, the PCIe communication protocol or the USB3.0 communication protocol and automatically executes the corresponding firmware unit. As previously described, the conventional electronic card is not user-friendly because it only supports a single communication protocol. Since the firmware unit of the electronic card of the present invention is selectively executed according to the communication protocol of the host, the electronic card is more user-friendly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A detecting method for an electronic card, the electronic card having a connector supporting a SATA communication protocol, a PCIe communication protocol and a USB 3.0 communication protocol, the electronic card receiving an output signal from a host through at least one of plural pins of the connector, the detecting method comprising steps of:
   (a) detecting whether the output signal is received by Pin 17, Pin 19, Pin 23 and Pin 25 or Pin 5, Pin 7, Pin 11 and Pin 13;
   (b) if a detecting result of the step (a) is satisfied, judging that a communication protocol of the host is the PCIe communication protocol and ending the detecting method;
   (c) if the detecting result of the step (a) is not satisfied, detecting whether the output signal is received by Pin 41, Pin 43, Pin 47 and Pin 49;
   (d) if a detecting result of the step (c) is satisfied, judging that the communication protocol of the host is the PCIe communication protocol or the SATA communication protocol according to the output signal and ending the detecting method;
   (e) if the detecting result of the step (c) is not satisfied, detecting whether the output signal is received by Pin 29, Pin 31, Pin 35 and Pin 37; and
   (f) if a detecting result of the step (e) is satisfied, judging that the communication protocol of the host is the PCIe communication protocol or the USB 3.0 communication protocol according to the output signal and ending the detecting method, wherein if the detecting result of the step (e) is not satisfied, the detecting method is ended.

2. The detecting method according to claim 1, wherein in the step (d), the detecting method further comprises a step of confirming that the communication protocol of the host is the PCIe communication protocol according to a voltage difference range.

3. The detecting method according to claim 1, wherein in the step (d), the detecting method further comprises a step of confirming that the communication protocol of the host is the SATA communication protocol according to a voltage difference range.

4. The detecting method according to claim 1, wherein in the step (f), the detecting method further comprises a step of confirming that the communication protocol of the host is the PCIe communication protocol according to a voltage difference range.

5. The detecting method according to claim 1, wherein in the step (f), the detecting method further comprises a step of confirming that the communication protocol of the host is the USB 3.0 communication protocol according to a voltage difference range.

6. The detecting method according to claim 1, wherein in the step (d), the detecting method further comprises a step of judging whether a communication protocol of the output signal is the PCIe communication protocol or the SATA communication protocol according to a signal definition of a physical layer, wherein if the communication protocol of the output signal is the PCIe communication protocol, the communication protocol of the host is judged as the PCIe communication protocol, wherein if the communication protocol of the output signal is the SATA communication protocol, the communication protocol of the host is judged as the SATA communication protocol.

7. The detecting method according to claim 1, wherein in the step (f), the detecting method further comprises a step of judging whether a communication protocol of the output signal is the PCIe communication protocol or the USB 3.0 communication protocol according to a signal definition of a physical layer, wherein if the communication protocol of the output signal is the PCIe communication protocol, the communication protocol of the host is judged as the PCIe communication protocol, wherein if the communication protocol of the output signal is the USB 3.0 communication protocol, the communication protocol of the host is judged as the USB 3.0 communication protocol.

8. A detecting method for an electronic card, the electronic card having a connector supporting a SATA communication protocol, a PCIe communication protocol and a USB 3.0 communication protocol, the electronic card receiving an output signal from a host through at least one of plural pins of the connector, the detecting method comprising steps of:
   (a) defining a first detecting operation, a second detecting operation and a third detecting operation, and detecting whether the output signal is received by the corresponding pins of the connector when the first detecting operation, the second detecting operation or the third detecting operation is performed, wherein when the first detecting operation is performed, the electronic card detects whether the output signal is received by Pin 5, Pin 7, Pin 11 and Pin 13 or Pin 17, Pin 19, Pin 23 and Pin 25 of the connector 11, and the communication protocol of the host is judged as the PCIe communication protocol if a detecting result of the first detecting operation is satisfied, wherein when the second detecting operation is performed, the electronic card detects whether the output signal is received by Pin 41, Pin 43, Pin 47 and Pin 49, and the communication protocol of the host is judged as the PCIe communication protocol or the SATA communication protocol if a detecting result of the second detecting operation is satisfied, wherein when the third detecting operation is performed, the electronic card detects whether the output signal is received by Pin 29, Pin 31, Pin 35 and Pin 37, the communication protocol of the host is judged as the PCIe communication protocol or the USB3.0 communication protocol if a detecting result of the third detecting operation is satisfied;
   (b) performing any detecting operation of the first detecting operation, the second detecting operation and the third detecting operation, wherein if the communication protocol of the host is recognized, the detecting method is ended;
   (c) if the communication protocol of the host is not recognized in the step (b), performing another detecting operation of the first detecting operation, the second detecting operation and the third detecting operation, wherein if the communication protocol of the host is recognized, the detecting method is ended; and
   (d) if the communication protocol of the host is not recognized in the step (c), performing a remaindering detecting operation of the first detecting operation, the second detecting operation and the third detecting operation, and then ending the detecting method.

9. The detecting method according to claim 8, wherein in the step (b), the first detecting operation is performed.

10. The detecting method according to claim 9, wherein in the step (c), the second detecting operation is performed.

11. The detecting method according to claim 8, wherein if the output signal is received by Pin 41, Pin 43, Pin 47 and Pin 49 when the second detecting operation is performed, the communication protocol of the host is judged as the PCIe communication protocol according to a voltage difference range.

12. The detecting method according to claim 8, wherein if the output signal is received by Pin 41, Pin 43, Pin 47 and Pin 49 when the second detecting operation is performed, the communication protocol of the host is judged as the SATA communication protocol according to a voltage difference range.

13. The detecting method according to claim 8, wherein if the output signal is received by Pin 29, Pin 31, Pin 35 and Pin 37 when the third detecting operation is performed, the communication protocol of the host is judged as the PCIe communication protocol according to a voltage difference range.

14. The detecting method according to claim 8, wherein if the output signal is received by Pin 29, Pin 31, Pin 35 and Pin 37 when the third detecting operation is performed, the communication protocol of the host is judged as the USB 3.0 communication protocol according to a voltage difference range.

15. The detecting method according to claim 8, wherein if the output signal is received by Pin 41, Pin 43, Pin 47 and Pin 49 when the second detecting operation is performed, the electronic card further detects whether a communication protocol of the output signal is the PCIe communication protocol or the SATA communication protocol according to a signal definition of a physical layer, wherein if the communication protocol of the output signal is the PCIe communication protocol, the communication protocol of the host is judged as the PCIe communication protocol, wherein if the communication protocol of the output signal is the SATA communication protocol, the communication protocol of the host is judged as the SATA communication protocol.

16. The detecting method according to claim 8, wherein if the output signal is received by Pin 29, Pin 31, Pin 35 and Pin 37 when the third detecting operation is performed, the electronic card further detects whether a communication protocol of the output signal is the PCIe communication protocol or the USB 3.0 communication protocol according to a signal definition of a physical layer, wherein if the communication protocol of the output signal is the PCIe communication protocol, the communication protocol of the host is judged as the PCIe communication protocol, wherein if the communication protocol of the output signal is the USB 3.0 communication protocol, the communication protocol of the host is judged as the USB 3.0 communication protocol.

* * * * *